United States Patent
Houghton et al.

(10) Patent No.: US 11,466,721 B1
(45) Date of Patent: Oct. 11, 2022

(54) NEAR ZERO SHOCK AND MOMENTUM TRANSFER SELECTIVELY RELEASABLE SEPARATION NUT

(71) Applicants: Jeanette Ann Houghton, Calgary (CA); Worthington Bowie Houghton, Jr., Calgary (CA)

(72) Inventors: Jeanette Ann Houghton, Calgary (CA); Worthington Bowie Houghton, Jr., Calgary (CA)

( * ) Notice: Subject to any disclaimer, the term of this patent is extended or adjusted under 35 U.S.C. 154(b) by 476 days.

(21) Appl. No.: 16/699,303

(22) Filed: Nov. 29, 2019

Related U.S. Application Data (60) Provisional application No. 62/906,239, filed on Sep. 26, 2019.

(51) Int. Cl.
| | |
|---|---|
| *F16M 11/00* | (2006.01) |
| *F16B 37/08* | (2006.01) |
| *B64G 1/64* | (2006.01) |
| *F16F 15/03* | (2006.01) |
| *F16F 15/18* | (2006.01) |
| *F42B 15/36* | (2006.01) |

(52) U.S. Cl.
CPC .......... *F16B 37/0864* (2013.01); *B64G 1/645* (2013.01); *F16F 15/035* (2013.01); *F16F 15/18* (2013.01); *F42B 15/36* (2013.01)

(58) Field of Classification Search
CPC .... F16B 37/0864; F64G 1/645; F16F 15/035; F16F 15/18
See application file for complete search history.

(56) References Cited

U.S. PATENT DOCUMENTS

| | | | |
|---|---|---|---|
| 3,405,593 A * | 10/1968 | Kriesel | F16B 31/005 89/1.14 |
| 4,002,120 A | 1/1977 | Swales et al. | |
| 4,187,759 A | 2/1980 | Toy et al. | |
| 5,221,171 A | 6/1993 | Rudoy et al. | |
| 5,248,233 A | 9/1993 | Webster | |
| 5,282,709 A | 2/1994 | Chaput et al. | |
| 5,603,595 A | 2/1997 | Nygren | |
| 6,352,397 B1 * | 3/2002 | O'Quinn | B64G 1/645 411/270 |
| 6,450,064 B1 | 9/2002 | Christianen et al. | |
| 6,454,214 B1 | 9/2002 | Smith | |
| 7,001,127 B2 * | 2/2006 | Tuszynski | B64G 1/645 411/433 |

(Continued)

*Primary Examiner* — Amy J. Sterling (57) ABSTRACT

A selectively releasable separation nut for securing a payload and/or deployable equipment (hereafter "second body") to a rocket, missile, or aircraft or spacecraft (hereafter "first body") by way of a preloaded bolt, or other fastener, and releasing them on command. The separation nut may have magnetic eddy current damping components that dissipate as heat the strain energy stored in the separation nut, the bolt, and surrounding first body and second body structures during the bolt preload release. Energy not dissipated as heat during preload release may be stored as kinetic energy and dissipated as heat after the bolt mechanical release. The bolt acceleration and velocity are controlled throughout the release cycle. The bolt kinetic energy post release is less than 0.01% of the stored strain energy pre-release. Shock, impulse, and momentum transfer to the released second body are near zero.

37 Claims, 7 Drawing Sheets

(56) References Cited

U.S. PATENT DOCUMENTS

| | | | | |
|---|---|---|---|---|
| 7,862,282 B2 * | 1/2011 | Smith | ............... | F16B 31/005 |
| | | | | 411/433 |
| 8,651,765 B2 | 2/2014 | Baonza | | |
| 8,678,323 B2 * | 3/2014 | Barber | ............... | B64G 1/641 |
| | | | | 411/909 |
| 10,329,036 B2 | 6/2019 | Cassanelli et al. | | |
| 10,480,898 B2 * | 11/2019 | Kim | ............... | F41F 3/052 |
| 2018/0170585 A1 | 6/2018 | Hay et al. | | |
| 2020/0307835 A1 * | 10/2020 | Arulf | ............... | F16B 37/0864 |

* cited by examiner

NEAR ZERO SHOCK AND MOMENTUM TRANSFER SELECTIVELY RELEASABLE SEPARATION NUT

BACKGROUND OF THE INVENTION

1. Field of the Invention

The present invention relates to a separation nut that generates near zero shock and momentum transfer to a released payload or deployable equipment for launch vehicle, missile, and spacecraft applications.

2. Background of the Invention

In launch vehicle, missile, and spacecraft applications it is sometimes desirable to hold down payloads or deployable equipment during launch and then release them on command. The hold down function is typically through a preloaded bolt, or other fastener, that connects the payload or deployable equipment, hereafter second body, to a launch vehicle, missile, or spacecraft, hereafter first body, by way of a separation nut. The bolt is typically withdrawn from the separation nut by a bolt catcher that may incorporate a spring to withdraw and capture the bolt and a deformable pad to damp the impact of the bolt within the bolt catcher. The hold down operation results in the storage of strain energy in a preload force loop proportional to the hold down preload force and the deflections of the separation nut, bolt, first body, second body, and bolt catcher. During the release operation the stored strain energy is converted to kinetic energy in the form of ½ mass times velocity squared of each of the deflected components. The released kinetic energy is manifested as impulse, or shock, during acceleration and stopping of the moving components within the separation nut, velocity of the bolt post release, and as momentum transfer to the released second body by the moving bolt that may be transferred to and captured by the released second body. Shock may occur when a fast-moving released bolt is stopped within the bolt catcher. Shock may damage sensitive electronics such as clock oscillators, alignment sensitive optics such as telescopes and star finders, or less robust mechanical mechanisms. Impulse conducted through the first body and momentum transfer to a released second body may adversely affect attitude-sensitive or formation flying satellites or the accuracy of released weapons.

The present invention is a separation nut that effectively dissipates virtually all, greater than 99.99%, of the stored strain energy in the separation nut and the preload force loop as heat. Shock caused during release is predicted to be less than 20 g on a standard test fixture, or less than 10% of that of the best mechanisms of the prior art and less than 2% of that of the typical mechanisms of the prior art. Momentum transfer is predicted to be less than 1% that of prior art mechanisms used in launch vehicle and missile applications. The present invention can be reset in situ and does not require refurbishment between operations. Its performance will not degrade over time.

Some separation nuts incorporate pyrotechnic actuators. Pyrotechnic actuators generally utilize an electrically ignited NASA Standard Initiator to, in-turn, ignite a high-pressure chemical gas generator. The high-pressure gas drives a piston to affect release of the mechanism load. Pyrotechnically actuated release mechanisms generally cause high shock and impulse due to the high acceleration and deceleration of the moving piston and may transmit the pyrotechnically generated momentum and impulse to the released payload through the surrounding structure. Momentum may be transmitted to the released payload by way of the released bolt mass times velocity and shock generated when the moving bolt is stopped. Pyrotechnically actuated release devices are typically used once and are not refurbished for re-use.

"Missile Stage Coupler," U.S. Pat. No. 4,002,120, 1/1997, Swales, assigned to The United States of America as represented by the Secretary of the Navy, is an example of a pyrotechnic release device and bolt catcher for separating stages of a missile, such a booster stage and a re-entry vehicle. A stated object of the invention is "minimizing the possibility of tipoff (re-entry body angular velocity induced during the separation operation) or other flight perturbation." The separation nut assembly ejects " . . . separation bolt from the separation nut assembly with great force. The bolt travels upward within bolt catcher chamber at high velocity, exerting considerable separation force on the cover. . . . In practice, virtually no time lag exists between the transmission of the (release) signal to the pyro squib and the release of the separation bolt." Analyses conducted during development of the present invention on similar pyrotechnic separation nuts in multi-separation nut re-entry body release systems showed that release simultaneity errors between the multiple separation nuts of just a few microseconds, when combined with the high impulse of pyrotechnic separation nuts and high momentum transfer of high velocity separation bolts, can cause a significant increase in the tipoff velocity, and reduction in targeting accuracy, of the released re-entry body.

The present invention minimizes tipoff velocity of released bodies by transferring near zero impulse and momentum to the released body. The increased simultaneity error between multiple units of the present invention, estimated at less than 0.5 milliseconds, is more than offset by the near zero impulse and momentum transfer of the present invention. Analysis predicts that the present invention causes less than 1% of the tipoff velocity of identical re-entry bodies than separation nuts of the prior art.

"Flywheel Nut Separable Connector and Method," U.S. Pat. No. 5,603,595, Nygren, Jr., assigned to Martin Marietta Corp., claims an estimated 90% conversion of the strain energy in a connecting member into rotational kinetic energy in a rotating flywheel by way of a long pitch thread on the connecting member and internal to the flywheel. Stated flywheel rotational speed "may exceed 5,000 rpm" and thread lead is one inch per revolution. No energy dissipation method other than bearing and thread friction is incorporated. The connecting member does not separate from the flywheel until after the connecting member strain energy has been converted to kinetic energy. The connecting member velocity, kinetic energy, and momentum at release are a function of the flywheel rotational velocity and the thread pitch plus the potential energy stored in the retractor housing spring. Based on the given parameters, calculated connecting member velocity at release will exceed 83 inches per second. Significant momentum transfer to the released "second surface" and shock from stopping the connecting member within the retractor housing can be expected. In contrast, in the present invention when preloaded to 10,000 pounds, the bolt, including spring spacer or cup, velocity post release is calculated to be less than three inches per second.

The "Reduced Shock Separation Fastener," U.S. Pat. No. 6,352,397, O'Quinn, et al, assigned to Hi-Shear Corporation (now Chemring Energetic Devices) is pyrotechnically released. It attempts to reduce shock by the incorporation of a limited rotation rotating ring that converts a portion of the bolt preload strain energy to heat through friction and to kinetic energy in the ring during release. Compliant pads stop the fast-moving pyrotechnically driven piston. U.S. Pat. No. 7,001,127, Tuszynski, also assigned to Hi-Shear Corporation, is a similar device that uses an electrical actuator to drive the initial release mechanism. Both mechanisms rely upon friction, created by the preload force, to both ensure load retention and ensure release.

A common initial release device used in electromechanical separation nuts is a fusible link. In these mechanisms, redundant load retaining wire links are electrically heated until they fuse, fail and release the bolt preload carrying mechanisms within the release device. One such device is U.S. Pat. No. 5,221,171, Rudoy et al, assigned to G & H Technology (now Eaton) that releases a split nut retention device when either of two fusible links is fused. This device does not incorporate bolt energy dissipation elements and hence causes both high shock and high momentum transfer to released payloads. U.S. Pat. No. 6,433,990, Rudoy et al, (assigned to NEA Electronics, Inc) uses redundant fusible links to release one end of a restraining wire, or strap, wrapped around a split spool. When the wire is released, it uncoils from around the split spool which releases a stud that carries the preload. Some reduction in shock is afforded by the energy dissipation that occurs while the wire uncoils and the split spool spreads. The fusible links must be replaced if the units are to be refurbished and reused.

Another type of separation nut incorporates shape memory alloy (SMA) actuators to release the preload carrying bolt. Shape memory alloys are formulated and processed so that when heated to their transformation temperatures they change phase and revert back to their "memorized" size or shape. Some SMA's change phase at 75 to 80 degrees C. and may change shape and cause premature release due to solar heating of spacecraft in which they may be utilized. One such mechanism is "Resettable Separation Mechanism With Antifriction Bearings," U.S. Pat. No. 6,450,064, Christiansen, et al, (assigned to Starsys Research Corporation). This mechanism uses an SMA wire, with relatively short actuation stroke and low force, to release a cascaded mechanism that releases a split nut that releases the preload carrying bolt. Another SMA released mechanism, U.S. Pat. No. 7,544,257 B2, Johnson, et al (assigned to TiNi Alloy Company) uses an SMA cylinder, that when heated expands to increase the stress in a notched preload carrying bolt until the stress at the notch exceeds the ultimate strength of the bolt material, the bolt fails structurally, and the load is released. Neither of these SMA-release mechanisms incorporates strain energy dissipation elements and the undissipated energy is manifested as high bolt shank acceleration during release, high bolt velocity following release, high shock when the bolt is stopped, and high momentum transfer to a released payload or deployable equipment.

Momentum transfer by way of a released bolt, and its' adverse effect on released body tipoff velocity, from many electromechanical release devices of the prior art may be similar in magnitude to that of pyrotechnic separation nuts.

U.S. Pat. No. 5,248,233, No Shock Separation Mechanism, Webster, describes a release mechanism wherein the preload is carried as compression in an SMA column. When the SMA column is heated, it shrinks in length, relieving the tension on the preload carrying bolt, allowing a spring-loaded retainer to move and open a split nut so that the preload carrying bolt can be withdrawn. It may release when exposed to environmental shock if the preload is low.

Release mechanisms of the prior art may dissipate energy only through friction. However, friction is highly unpredictable due to changes in force between contacting parts, wear of the contacting parts, and lubricant viscosity changes. As a result, if the friction is too high the mechanism may not release and if it is too low the mechanism may release, or partially release, due to environmental shock, vibration, and temperature. If the friction is too low less than optimal energy may be dissipated resulting in high shock and momentum transfer during and following release.

SUMMARY OF THE INVENTION

One embodiment of the present invention is a selectively releasable separation nut for holding, by way of a preloaded bolt, or other fastener, payloads and/or deployable equipment secure against vibration during launch by launch vehicles (aircraft, rockets, or missiles) and releasing them on command. During bolt preload release a portion of the strain energy stored in the separation nut, bolt, and surrounding structure preload force loop is dissipated as heat and residual strain energy is stored as kinetic energy within the separation nut so that the bolt potential and kinetic energy at release are essentially zero. Following bolt release the stored kinetic energy within the separation nut is dissipated as heat. The separation nut may have elements that dissipate kinetic energy as heat, control the velocity of the bolt preload release, and compensate for changes in temperature, friction, and aging.

BRIEF DESCRIPTION OF THE DRAWINGS

FIG. 4, are rotated into the plane of FIG. 2 for clarity.

DETAILED DESCRIPTION OF THE INVENTION

Figure 1:
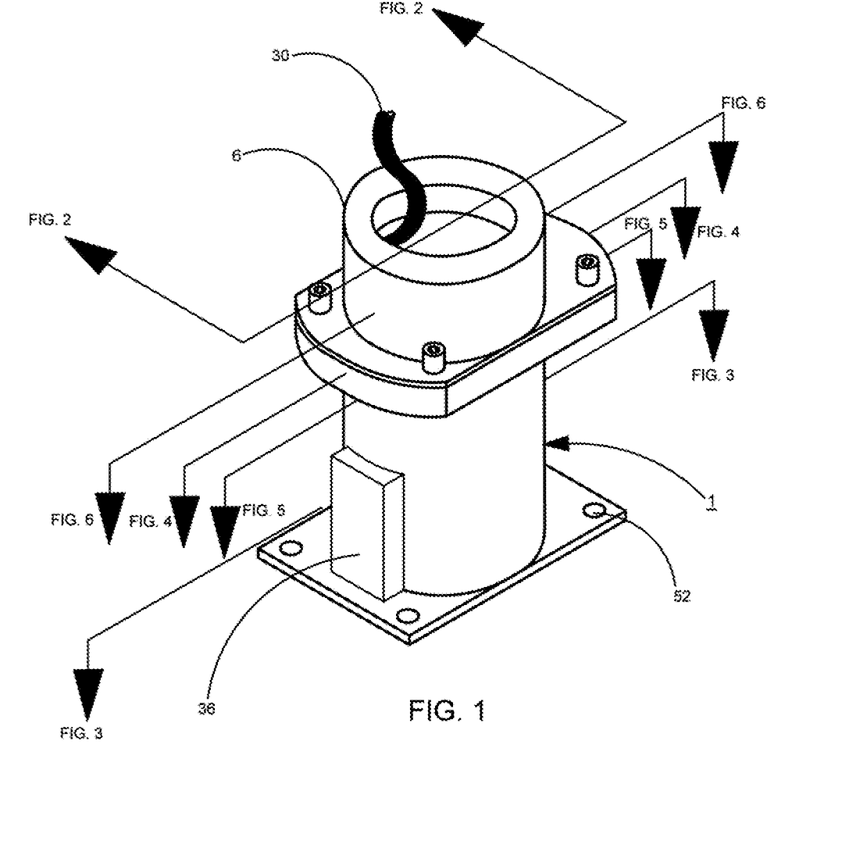
FIG. 1 is an isometric view of the separation nut 1 showing the cover 6, pigtail leads 30, ball return cover 48, and mounting features 52.
Figure 2:
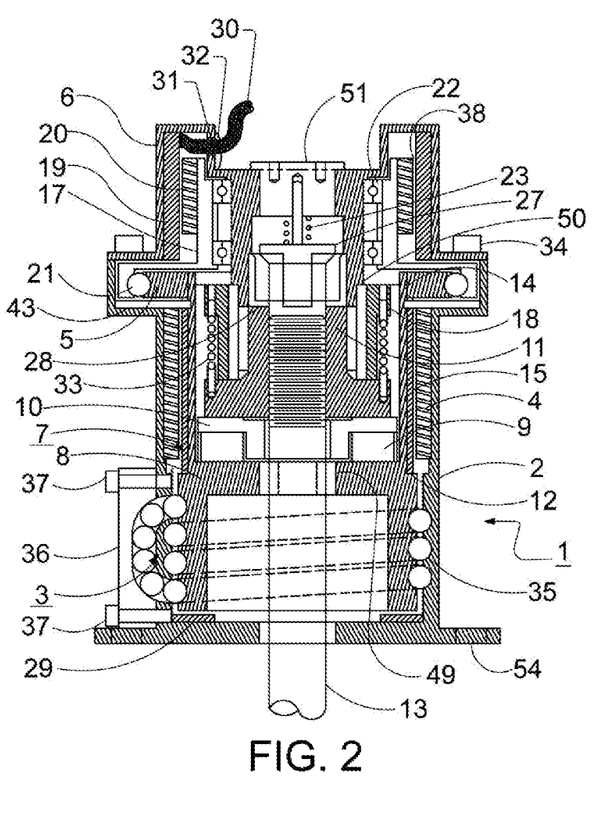
FIG. 2 is a cross-sectional view of the separation nut. Cover lugs 50 and split nut segments 11, and notches 28.

One embodiment of the present invention is a separation nut 1, FIG. 1, for holding by way of a preloaded bolt 13, FIG. 2, a payload and/or deployable equipment (hereafter second body) securely to an aircraft, a launch vehicle, or spacecraft (hereafter first body) securely against vibration and shock and releasing the second body upon an electrical command signal. Strain energy stored in a preload force loop comprising the separation nut, the preloaded bolt, the first body, and the second body, is converted to kinetic energy within the separation nut and converted to heat by an eddy current damper and friction both during preload release and following the bolt mechanical release.

The present invention embodies a multi-stage release and energy dissipation cycle comprising:

A locked condition in which a structural preload force loop secures a second body to a first body by way of the separation nut and the preloaded bolt.

An initial actuation in response to an externally supplied selectable electrical command signal.

A preload reduction to zero, at a controllable rate, of the forces within the structural preload force loop, dissipation of a portion of the stored strain energy as heat within the hold down and release mechanism, and storage of residual strain energy stored in the preload force loop that is not dissipated as heat, as kinetic energy within the separation nut.

A mechanical release of the bolt.

A dissipation of the stored kinetic energy as heat following the mechanical release of the bolt.

The separation nut 1, FIG. 2, may have elements that store and dissipate kinetic energy as heat and comprise a feedback system that controls the acceleration and velocity of the bolt 13 during preload release. During bolt 13 preload release the preferred embodiment of the invention dissipates a portion of the stored strain energy as heat through a combination of electromagnetic eddy current damping and mechanical friction in the release mechanism 1. The residual un-dissipated preload energy is stored as kinetic energy in the linearly moving rotor assembly 7 and rotating rotor 8 during preload release. When the bolt 13 has fully released its preload and its strain energy has been released, the strain energy has either been dissipated as heat or stored as kinetic energy in the rotor assembly 7 and dynamically balanced rotor 8. When the bolt 13 preload is zero, the radial bolt preload thread reaction force of the split nut segments 11 on lock ring 18 is also zero, and lock ring 18 is free to rotate and allow split nut segments 11 to separate and mechanically release bolt 13, FIG. 4. Following bolt 13 mechanical release from the split nut segments 11, eddy current damping and mechanical friction in the preferred embodiment convert the rotor assembly 7 and dynamically balanced rotor 8 kinetic energy to heat and stop the rotor assembly 7 and dynamically balanced rotor 8 rotation and translation.

Figure 4:
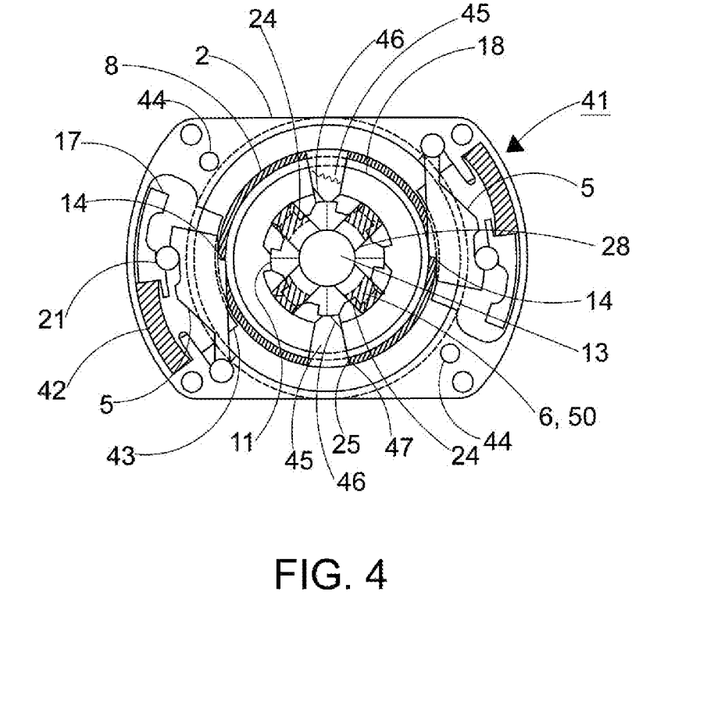
FIG. 4 is a cross-sectional view of the initial release mechanism and split nut segments 11 anti-rotation features, cut at the level of the sear release bearings 21, looking down.

The initial release mechanism 41, FIG. 4, components of the present invention preferred embodiment, with the exception of the sears 5, are dynamically balanced and rotate about their centers of gravity axes. Linear vibration and shock, as defined in typical customer separation nut specifications, will not act upon the present invention's dynamically balanced release components to cause rotation and premature release. Prior to initial release the low-mass sears 5 are mechanically locked by release armature 17 and bearings 21 and are not susceptible to shock and vibration.

Figure 6:
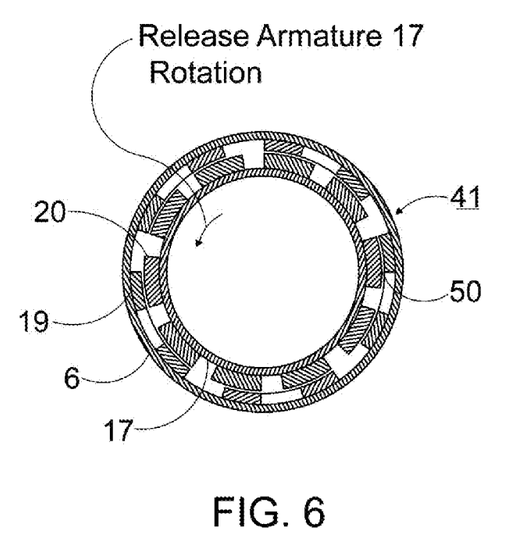
FIG. 6 is a cross-sectional view of the release armature 17, motor windings 19, and motor magnet segments 20 looking down at the top of release armature 17.

The present invention preferred embodiment incorporates an initial release mechanism 41 incorporated into cover 6, FIG. 6, and housing 2, FIG. 4. A direct current electric motor 19, 20, FIG. 6, is incorporated into cover 6, FIG. 2, to affect initial release. Ten motor magnet segments 20 are bonded to the outside diameter of release armature 17, FIG. 2, 6. The magnet segments 20 alternate radial polarity, so that every other magnet segment has its north pole on its outside diameter and each adjacent magnet segment has its south pole on its outside diameter. Primary and redundant motor windings 19 and their leads 30, FIG. 2, are bonded to the inside surface of cover 6 so that the leads 30 are not flexed due to environmental shock or vibration or during operation. Each motor winding 19 is comprised of five rectangular coils wound and formed to fit the inside radius of cover 6.

As shown in FIG. 6, the portion of each coil where the current flow is within the fields of magnets 20 and parallel to the motor 19, 20 rotational axis generates torque that causes release armature 17 to rotate counterclockwise. Electrically shielded leads 30 supply an electrical release signal from the first body to the primary and redundant windings 19 and are routed out of the release mechanism 1 through the port 31, FIG. 2, in cover 6 and conductive epoxy strain relief 32.

Release armature 17 is supported and aligned by rolling element guide bearings 22, FIG. 2, and rolling element bearings between release armature 17 and sears 5. The rolling element bearings minimize friction and the torque requirement for the electric motor 19, 20.

As shown in FIG. 6, each winding 19 coil spans two oppositely polarized magnet segments 20 so that the tangential forces, and torque, generated by each side of the coils are in the same direction. The nominal full-torque tangential stroke of the motor 19, 20 equals the magnet segment 20 tangential width minus the winding 19 coil tangential width. The motor 19, 20, and release armature 17, nominal full torque angular stroke, in radians, is then (the tangential stroke)/(the winding 19 mean radius). The mechanism may be designed so that release armature 17 travel is greater than the full-torque motor angular stroke so that motor 19, 20 torque will decrease when the winding 19 coils are over the gaps between the magnet segments 20 and reverse direction when the coils approach the next oppositely polarized magnet segment 20. The release armature 17 will stop when the reverse torque plus the return springs 42, FIG. 4, torques equals the motor 19, 20 driving torque. This non-impact means of stopping release armature 17 further reduces the shock generated by the separation nut 1 during release.

Cover 6 and release armature 17, FIG. 2 and FIG. 6, comprise the magnetic circuit for the motor 19, 20. They may be composed of multiple alloys or coatings to satisfy structural, magnetic performance, and anti-corrosion requirements. Magnet segments 20 may be fabricated from neodymium boron iron or other magnet material at the discretion of the designer. Magnetic flux flows radially outward from the north poles of five first magnet segments 20, across a mechanical clearance gap 38, through the motor windings 19, clockwise and counterclockwise through the cover 6, radially inwards through the motor windings 19, across the gap 38, into the south poles of the five alternately polarized magnet segments 20, clockwise and counterclockwise through the release armature 17, and then back into the south poles of the five first magnet segments 20.

Torque developed by the motor 19, 20 is calculated by the equation $$T=BlirN$$

where T, torque, is in newton-meters, B, magnetic gap flux, is in Tesla, l, active coil length in the magnetic gap per magnet, is in meters, i, motor current, is in amps, r, winding 19 coil mean radius, is in meters, and N, is the number of magnet segments 20. The metric units may be converted to English units, or vice-versa, for consistency in the calculations at the discretion of the analyst. Alternative motor configurations may occur to those skilled in the art.

Figure 3:
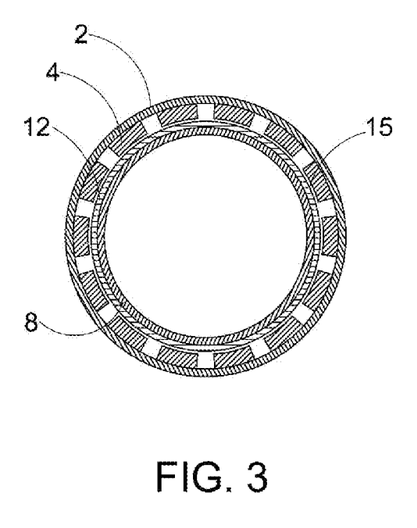
FIG. 3 is a cross-sectional view of the release velocity control damping and energy storage system within the separation nut 1 cut through the damper 12 looking down.

The preferred embodiment of the present invention primarily uses an eddy current damper, FIG. 3, to dissipate the strain energy stored in the preload force loop as heat. Energy dissipation through friction is unavoidable. However, friction is highly unpredictable due to changes in force between contacting parts, wear of the contacting parts, and lubricant viscosity changes. The present invention incorporates rolling element bearings in all highly loaded mechanical interfaces to minimize friction and the inherent feedback system minimizes the effects of friction variation.

The magnetic eddy current damper, FIG. 3, consists of fourteen damper magnet segments 4 bonded, or otherwise affixed, to the inside diameter of housing 2, FIG. 2. The damper magnet segments 4 alternate radial polarity, so that every other magnet segment has its north pole on its inside diameter and each adjacent magnet segment has its south pole on its inside diameter. Housing 2 and rotor 8, FIG. 2 and FIG. 3, comprise the magnetic circuit for the eddy current damper. They may be composed of multiple alloys or coatings to satisfy structural, magnetic, and anti-corrosion requirements. Damper magnet segments 4 may be fabricated from neodymium boron iron or other magnet material at the discretion of the designer. Magnetic flux flows radially inward from the north poles of seven first magnet segments 4, FIG. 3, across a mechanical clearance gap 15, through the conductive damper ring 12, clockwise and counterclockwise through the rotor 8, radially outward through the conductive damper ring 12, across the gap 15, into the south poles of the seven alternately polarized damper magnet segments 4, clockwise and counterclockwise through the housing 2, and then back into the south poles of the seven first damper magnet segments 4. Other numbers of magnet segments 4 can be used, or the magnets can be affixed to the rotor 8 and the damper ring 12 affixed to the housing 1, at the discretion of the designer.

Eddy current damping is linearly proportional to the relative velocity between the magnet segments 4 and the conductive damper 12, FIG. 2. Damping torque and energy dissipation are maximum when the split nut segments 11, thread end of bolt 13, and the rotor assembly 7 linear velocity and rotor 8 rotational velocity are maximum and are zero when their velocities are zero. Unlike mechanical friction damping, magnetic eddy current damping has no stick-slip characteristic where the damping coefficient changes between when there is no relative motion between the magnet segments 4 and the conductive damper 12 and when there is relative motion. The separation nut 1, FIG. 1, will not stall and fail to release due to friction inconsistencies if the bolt 13 preload is very low and release is driven solely by spring 23, FIG. 2.

When the separation nut 1 is released the dynamically balanced rotor 8 rotates in ball screw assembly 3 and the radial magnetic flux moves tangentially and downwards through the damper ring 12 so that a circulating electric current is induced in the plane of the damper ring 12 normal to the radial magnetic flux. The magnetic fields of the induced currents in damper ring 12 oppose the magnet segment 4 magnetic fields which results in damping forces that oppose the rotation of the rotor 8.

Following bolt 13 mechanical release the residual energy that was not dissipated as heat through eddy current damping and mechanical friction is stored as kinetic energy in the linearly moving rotor assembly 7 and the rotating dynamically balanced rotor 8, FIG. 2. Dynamically balanced rotor 8 continues to rotate downwards on the ball screw 3 until all kinetic energy is dissipated as heat from eddy current damping and mechanical friction. Any residual energy at the end of the rotor 8 travel is dissipated by friction with and compression of resilient pad 29.

In the preferred embodiment of the present invention the instantaneous eddy current damping torque on the rotor 8 can be calculated from the equation $$Tdamping = \frac{B^2 l^2}{R} \omega\ r^2 N$$

where Tdamping, instantaneous damping torque, is in Newton-meters, B, magnetic flux density in the conductive damper ring 12, is in Tesla, l, damper ring 12 active electrical circuit length between adjacent magnet segments, is in meters normal to the magnetic gap flux and the relative velocity of the rotating magnetic flux B, R, electrical resistance of the damper ring 12 total electrical circuit between adjacent magnet segments 4, is in ohms, $\omega$, the instantaneous rotational velocity of the rotor 8, is in radians/second, r, radius of the damper 12, is in meters, and N is the number of magnet segments 4. The total energy dissipated by the eddy current damper ring 12 is then $$Edamping = \int Tdamping\ d\theta$$

where Edamping, dissipated energy, is in Newton-meters and $d\Theta$, rotor 8 differential rotation angle, is in radians. The contribution to energy loss due to the linear velocity of rotor 8 is calculated similarly, though it is relatively low because both the linear velocity and linear distance traveled by rotor 8 are low. The metric units may be converted to English units, or vice-versa, for consistency in the calculations at the discretion of the analyst. The present invention analyses can be readily performed by anyone ordinarily skilled in physics and magnetics design and analysis. Alternative magnetic eddy current damper configurations may occur to those skilled in the art.

Mechanical friction is difficult to predict accurately due to its dependence upon variables including, but not limited to, surface contact normal force, surface finish, wear, lubricant viscosity, and the difference between static and dynamic friction coefficients. In the preferred embodiment of the present invention friction is minimized by rolling element bearings 3 and 9, FIG. 2, at high load interfaces in the mechanism to ensure release under worst case conditions. Prior to bolt 13 preload release the moving parts within the release mechanism 1 are mechanically retained against premature release caused by shock, vibration, other environmental impacts, or low preload rather than held in place by friction.

The stored energy converted to heat through mechanical rolling element friction is largely dependent upon the bearing geometry and the bearing force between the moving surfaces during the release cycle. The bearing force is in turn a function of the bolt 13 and spring 23 preload forces at any time during the release cycle. Friction is a maximum when the bolt 13 and spring 23 preloads are greatest at the start of preload reduction and minimum after the bolt 13 contracts to its unloaded length and its preload is zero. The instantaneous friction torque in the separation nut 1 rolling element bearings 3, 9 is calculated from the equation $$Tfriction = (F\mu r)$$

where T friction, instantaneous torque, is in inch-pounds, F, instantaneous bearing force, is in pounds, $\mu$ is the bearing coefficient of friction, and r, the radius of the normal force, is in inches. The energy converted to heat by friction during the release cycle is calculated by the equation $$Efriction = \int (F\mu r) d\theta$$

where Efriction, dissipated energy, is in inch-pounds, and $d\Theta$, differential angular rotation, is in radians. In the preferred embodiment of the present invention friction is minimized by rolling element bearings 3 and 9. As a result, the friction torque at any time during the release cycle is very low compared to the dynamically balanced rotor 8 torque developed from the remaining bolt 13 and spring 23 preloads and the release mechanism 1 will not stall during release. The total energy dissipated as heat by the separation nut throughout the release cycle is $$E\text{heat} = E\text{damping} + E\text{friction}$$

and is predicted to equal greater than 99.99% of the stored strain energy in the preload force loop pre-release.

The instantaneous kinetic energy of the linearly moving rotor assembly 7, including the dynamically balanced rotor 8 and conductive damper ring 12, split nut segments 11, and lock ring 18, FIG. 2, is proportional to the square of its linear velocity per the equation $$KE \text{ linear} = \frac{1}{2}mv^2$$

where KE linear, instantaneous kinetic energy, is in in-lbs, m, mass of the rotor assembly 7, is in lb-second²/inch, and v, velocity, is in inches/second.

The dynamically balanced rotor 8 and damper ring 12 are also rotating. The instantaneous kinetic energy of the rotating dynamically balanced rotor 8 and damper ring 12, FIG. 2 and FIG. 3, is proportional to the square of their rotational velocity per the equation $$KE \text{ rotational} = \frac{1}{2}I\omega^2$$

where KE rotational, instantaneous kinetic energy, is in inch-pounds, I, the rotor mass moment of inertia, is in inch-pound-seconds², and ω, rotational velocity, is in radians/second.

The total instantaneous kinetic energy stored is the sum of the instantaneous linear and rotational kinetic energies of the rotor assembly 7 and the dynamically balanced rotor 8 and damping ring 12.

The combination of the eddy current damper 4, 12 and bearing 3, 9 friction energy dissipation and rotor assembly 7 and dynamically balanced rotor 8 and damper ring 12, FIG. 2, energy storage characteristics results in a self-regulating feedback system that controls the mechanism 1 release acceleration and velocity. If friction energy dissipation increases, the release velocity decreases, the energy dissipated by the eddy current damper decreases, the kinetic energy stored in the rotor assembly 7 and dynamically balanced rotor 8 and damping ring 12 decreases, and the mechanism 1 release velocity stabilizes at a value that ensures that the energy being released by the bolt 13 and spring 23 equals the energy dissipated by friction and eddy current damping plus the stored kinetic energy at any time during release. For reasonable variations in friction torque, eddy current damping torque, and kinetic energy storage the time from bolt 13 preload maximum at the instant of preload release to bolt 13 preload equals zero is essentially constant for a given design. The bolt 13, rotor assembly 7, and dynamically balanced rotor 8 velocity, time, distance and angle traveled, and energy dissipation can be solved for by numeric integration of the equations or by simulation software.

During bolt 13 preload release, FIG. 2, the remaining bolt 13 preload force, separator 27 spring 23 force, and resulting rotor assembly 7 torque, are always several times greater than the torque necessary to overcome bearings 3 and 9 friction plus the eddy current damper 4, 12 torques so that the separation nut 1 will not stall during release. In the event that the bolt 13 preload is lost prior to preload release the separator 27 spring 23 has sufficient force to overcome friction and damping forces and ensure that the separator spring 23, segment separator 27, and torsion springs 33 will open the split nut segments 11 and the separation nut 1 will always release the bolt 13.

The preferred embodiment of the present invention separation nut 1, shown in FIG. 2, is supported by a steel housing 2 that provides structural support, an outer raceway for the low pitch recirculating ball screw 3, a magnetic return path for the eddy current damper 12 magnet segments 4 magnetic flux, reaction force support structure for the initial release system sears 5, and the cover 6. The ball screw 3 ball return path cover 36 is secured to housing 2 with screws 37. Screws 34 secure the cover 6 to the housing 2 and dowel pins 44, FIG. 4, or other features, align the cover 6 and react the bolt 13 tightening torque carried through the cover 6 and cover lugs 50. The housing 2 may be composed of multiple alloys or coatings to satisfy structural, magnetic performance, and anti-corrosion requirements. The magnet segments 4 may be fabricated from neodymium boron iron or other magnetic material and bonded in place using a suitable adhesive.

The bolt 13 preload reaction force is carried from the housing 2, FIG. 2, through the ball screw 3 and bearings 35, through the rotor 8, through the roller thrust bearings 9, through the upper thrust bearing race 10, to the split nut segments 11. The roller thrust bearings 9, the upper thrust bearing race 10, and the lower thrust bearing race in the rotor 8 may have spherical or conical surfaces to permit angular misalignment between the bolt 13 and the release mechanism 1. The split nut segments 11 may slide relative to the upper thrust bearing race 10 to permit radial misalignment between the bolt 13 and the release mechanism 1. The bolt 13 preload force loop is completed through the nut segments 11, through the bolt 13, to the attached second body, through the second body structure and first body structure, and back to the housing 2.

In the preferred implementation, FIG. 2, the outer race for ball screw 3 may be machined into housing 2. The dynamically balanced rotor 8 may be machined to function as the ball nut for the ball screw 3, support for the eddy current electrically conducting damper ring 12, the magnetic circuit return path from the magnets 4 through the damper ring 12, the locking notches 14, FIG. 4 and FIG. 5, that interface with the sears 5, FIG. 4, and the lock ring 18 reset surfaces 47, FIG. 4 and FIG. 5. The damper ring 12 may be fabricated as a cylinder from copper or other conductive material to improve damping efficiency or reduce weight. The dynamically balanced rotor 8 may be composed of multiple alloys and coatings to satisfy structural, magnetic, and anti-corrosion performance requirements. The damper ring 12 is bonded using a suitable adhesive or otherwise secured to the rotor 8 to prevent their relative motion. Gap 15 provides mechanical clearance between the magnets 4 and the damper 12. Polygonal socket 49 in the base of dynamically balanced rotor 8 interfaces with reset tool 53, FIG. 7.

Figure 5:
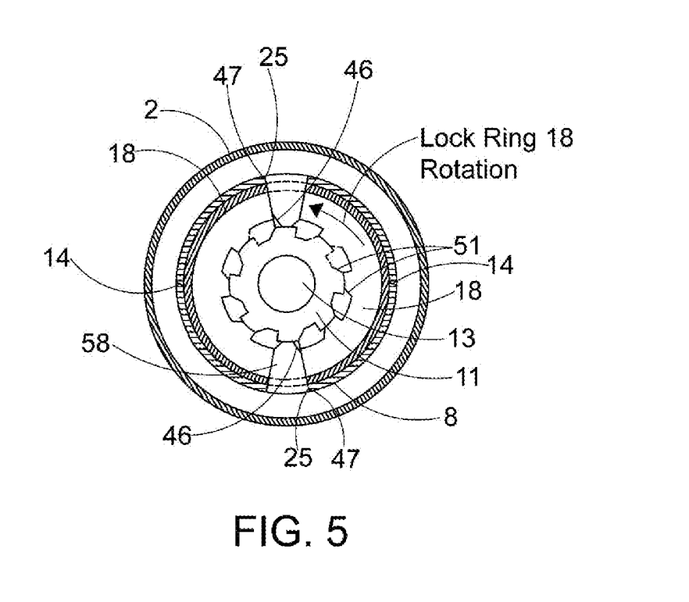
FIG. 5 is a cross-sectional view of features that limit the rotation of the lock ring 18 and index it to the split nut segments 11, cut at just below the level of the sear release bearings 21, looking down.

The preferred implementation shows four split nut segments 11, FIG. 4 and FIG. 5. Other split nut configurations may be used to interface with alternative bolt, or fastener, configurations. The split nut segments 11 are keyed to the cover 6 by segment notches 28, FIG. 2, and cover lugs 50, FIG. 2 and FIG. 4 and FIG. 4, to prevent their rotation about the mechanism rotational axis when the bolt 13, FIG. 2, is tightened and to ensure they do not rotate under vibration or shock loading and cause bolt 13 to lose preload. In FIG. 2 the cover lugs 50, split nut segments 11, and split nut segment notches 28 are rotated into the plane of FIG. 2 for clarity.

FIG. 4 shows the locked condition of the present invention initial release mechanism 41. The sears 5 are held into their mating notches 14 in the dynamically balanced rotor 8 by the rolling element bearings 21 and release armature 17. The sears 5 are supported by the plates 43 that may be screwed, or otherwise fastened, to housing 2. The contact angle between the sears 5 and the rotor notches 14 is selected to ensure that the interface will slip and the sears 5 will rotate outwards away from the rotor 8 notches 14 when the rotor 8 is forced to rotate down the ball screw 3 by the bolt 13 preload force and/or the spring 23 force. The sear 5 to rotor 8 contact angle is also selected to minimize the radial reaction force on the sears 5, rolling element bearings 21, and release armature 17 to minimize the friction that the motor 19, 20 must overcome to release the separation nut 1. Springs 42 hold the release armature 17 in its locked position until the electrical release signal is applied. Release armature 17 is dynamically balanced to reduce its susceptibility to vibration and shock.

FIG. 2 and FIG. 5, a section looking down just below the level of the sears 5 rolling element bearings 21, show how the lock ring 18 prevents the nut segments 11 from opening under the bolt 13 preload force and features that prevent rotation of the lock ring 18 when the rotor 8, FIG. 4, is locked by the sears 5. When the separation nut 1 is locked by the sears 5 the axial splines internal to the lock ring 18 and external to the nut segments 11 are aligned radially and prevent the nut segments 11 from opening due to the bolt 13 preload force reacting through the bolt 13 thread angle, the separator spring 23 force acting on the segment separator 27, and the springs 33, FIG. 2, radial forces.

When the mechanism 1 is preloaded, friction between the lock ring 18 and the split nut segments 11 radial splines prevents lock ring 18 from rotating and permitting the nut segments 11 to open, FIG. 4 and FIG. 5. If the preload force is reduced for any reason, the surfaces 25 on lugs 45 of the lock ring 18, FIG. 4, contact mating surfaces 47 on the locked rotor 8 and prevent the lock ring 18 from rotating, unlocking nut segments 11, and releasing the bolt 13 even if the bolt 13 preload force is zero, FIG. 4 and FIG. 5. When the rotor 8 rotates during release its surfaces 47 move out of contact with surfaces 25 on lugs 45 of lock ring 18 and free lock ring 18 to rotate when the tension in the preloaded bolt 13, and the split nut segments 11 to lock ring 18 friction, both reach approximately zero. Lock ring rotation 18 is stopped when its lug 45 surfaces 46, FIG. 4 and FIG. 5, contact the cover 6 lugs 50 surfaces 24, FIG. 4. When lock ring 18 is stopped its internal splines align with the spaces between the split nut segments 11 external splines, the split nut segments 11 are free to move outward radially, and bolt 13 can be withdrawn from the separation nut 1, FIG. 1, by a bolt catcher affixed to the second body.

There are two or more torsion springs 33, FIG. 2, one for each split nut segment 11. The top end of each spring connects to the top flange of the lock ring 18 and the bottom end of each spring connects to one segment of the split nut 11. The springs 33 provide torque to rotate lock ring 18 counterclockwise to misalign the lock ring 18 and split nut segment 11 splines so that the split nut segments 11 can open and release bolt 13. Springs 33 are wound such that their lower ends where they attach to the split nut segments 11 are compressed radially inwards during installation. The radial force facilitates opening the split nut segments 11 after the lock ring 18 has rotated following preload release. The springs 33 are wound such that they are axially aligned with each other and fit together in the manner of a multi-lead thread.

As shown in FIG. 2 and FIG. 4, during bolt 13 release the release armature 17 rotates, sears 5 are permitted to retract radially from the dynamically balanced rotor 8, and the preloaded bolt 13 and separator spring 23 forces cause the dynamically balanced rotor 8 to roll counterclockwise downwards on the ball screw 3 relative to the housing 2. The ball screw 3 has minimum pitch to maximize the rotational velocity of the dynamically balanced rotor 8, maximize eddy current damping energy dissipation, maximize rotor assembly 7 kinetic energy storage, and minimize dynamically balanced rotor 8 reaction forces against the sears 5 when the separation nut 1 is locked and preloaded. In the preferred embodiment of the present invention the dynamically balanced rotor 8 rotates counterclockwise, viewed from the top of the separation nut 1, during release so that torqueing bolt 13 will seat all of the moving components in their lowest energy states and time, vibration, shock, or thermal inputs will not cause mechanical shifting that would partially relieve the bolt 13 preload. Other rotation configurations might be used to satisfy specific application requirements.

Figure 7:
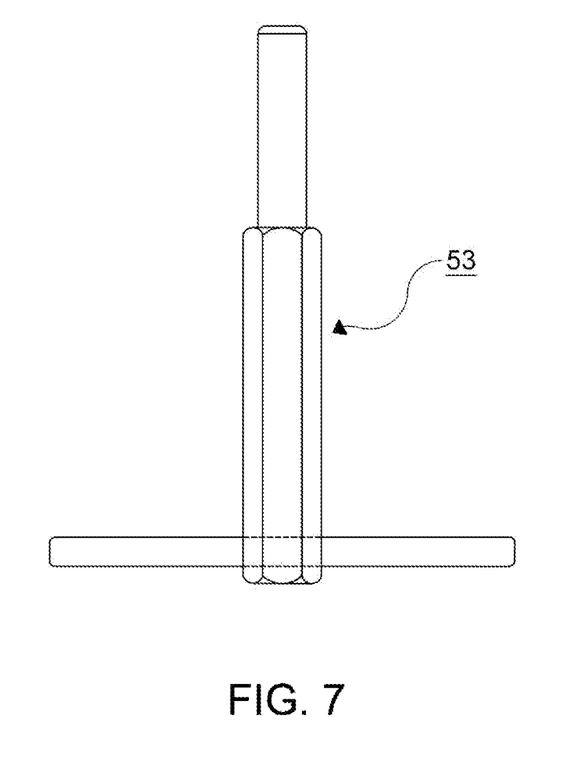
FIG. 7 is a view of the reset tool 53.

After release, the separation nut 1, FIG. 1, must be reset to prepare it to have the bolt 13 re-inserted and re-torqued. Separation nut 1 does not need to be refurbished. To reset the separation nut 1 the reset tool 53, FIG. 7, is inserted into the base of the separation nut 1 until the polygonal shank of reset tool 53 engages the polygonal socket 49 in dynamically balanced rotor 8 and the round end of reset tool 53 pushes the segment separator 27 clear of the split nut segments 11. The reset tool 53 is then turned counterclockwise, looking from the base of the separation nut 1, until the dynamically balanced rotor 8 engages the sears 5 and is locked in place. The return springs 42 rotate the release armature 17 clockwise, viewed from the top, and force the rolling element bearings 21 against the sears 5 so that the sears 5 are held in the locked position shown in FIG. 4. Counterclockwise rotation of dynamically balanced rotor 8 with reset tool 53, viewed from the bottom, engages rotor 8 surfaces 47 with lock ring 18 stop lugs 45 surfaces 25, FIG. 4 and FIG. 5, and rotates lock ring 18 counterclockwise, viewed from the base of separation nut 1, against the torque of torsion springs 33, FIG. 2. The interfacing beveled faces 51 on the lock ring 18 internal splines and the nut segments 11 external splines force the nut segments 11 radially inwards into their locked positions, FIG. 5. The surfaces 47 of the locked rotor 8 and surfaces 25 of lock ring 18 maintain the alignment of the lock ring 18 splines with the split nut 11 splines so that the split nut 11 remains closed, the bolt 13 can be threaded into split nut 11, and ensures that the bolt 13 cannot be released until the separation nut 1 is commanded to release by a control signal from the first body.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A selectively releasable separation nut assembly, comprising:

A selectively releasable separation nut, a bolt, and a reset tool, wherein: Said selectively releasable separation nut is affixed to a first body, said bolt secures said separation nut and said first body to a second body, and said selectively releasable separation nut releases said bolt and said second body from said selectively releasable separation nut and said first body in response to an externally supplied electrical signal, wherein: A preload force loop in said selectively releasable separation nut assembly and said first body and said second body comprising a preload on said bolt caused by tightening said bolt, a preload reaction force on said selectively releasable separation nut, caused by said preload on said bolt, a preload reaction force on said first body caused by said preload on said bolt, and a preload reaction force on said second body caused by said preload on said bolt.

2. The selectively releasable separation nut assembly as in claim 1, wherein: Said bolt in the he preferred implementation of the present invention has right hand threads and a head that enable it to be retained by the selectively releasable separation nut as in claim 1 and said second body until released in response to said externally supplied electrical signal.

3. The selectively releasable separation nut assembly as in claim 1, wherein: Said preload force loop stores strain energy proportional to the sum of the force on and the deflection of each of the structural elements of said preload force loop.

4. The selectively releasable separation nut assembly as in claim 1, comprising a selectively releasable separation nut, said selectively releasable separation nut having a release cycle comprising: A locked condition in which said preload force loop secures said second body to said first body, an initial actuation in response to said externally supplied electrical signal, a preload reduction to zero, at a controlled rate, of the forces within said structural preload force loop, dissipation of a portion of said stored strain energy as heat within the selectively releasable separation nut, and storage as a kinetic energy any residual of said strain energy not dissipated as heat within said selectively releasable separation nut, a mechanical release of said bolt, and a dissipation of said stored kinetic energy within said selectively releasable separation nut as heat following said mechanical release of said bolt.

5. The selectively releasable separation nut assembly as in claim 4, wherein: Said release cycle is predictable, repeatable, and largely unaffected by changes in the selectively releasable separation nut of internal friction, environmental impacts, and aging, and during said initial actuation and said preload reduction as in said release cycle, rotations of mechanical elements within said separation nut are counterclockwise when viewed from an end opposite said bolt, so that when said bolt is tightened mechanical clearances between the load bearing components within said selectively releasable separation nut are minimized, said selectively releasable separation nut will be in a minimum energy condition, and said structural preload force loop will not lose preload over time and environmental exposure.

6. The selectively releasable separation nut assembly as in claim 1 comprising said selectively releasable separation nut, said selectively releasable separation nut comprising: An electric motor actuated initial release mechanism, actuated by said externally supplied electrical signal, that initiates said preload reduction of said separation nut, a magnetic eddy current damper that dissipates, as heat, a portion of said strain energy released during said preload reduction, a mechanical friction that dissipates, as heat, a portion of said strain energy released during said preload reduction, a kinetic energy storage mechanism that stores as kinetic energy any residual of said strain energy released during said preload reduction, not dissipated by said magnetic eddy current damper and said mechanical friction as heat, said magnetic eddy current damper that dissipates, as heat, kinetic energy stored in said kinetic energy storage mechanism following the mechanical release of said bolt, and said mechanical friction that dissipates, as heat, kinetic energy stored in said kinetic energy storage mechanism following the mechanical release of said bolt.

7. The selectively releasable separation nut assembly as in claim 6, comprising said selectively releasable separation nut, wherein: said selectively releasable separation nut controllably dissipates energy as heat greater than 99.99% of said stored strain energy of said structural preload force loop, said selectively releasable separation nut, during said release cycle, generates near zero mechanical shock, and said selectively releasable separation nut and said bolt, during said release cycle transfer near zero momentum to the second body.

8. The selectively releasable separation nut assembly as in claim 1, comprising a selectively releasable separation nut, said selectively releasable separation nut further comprising: a housing fabricated from ferromagnetic and other material as appropriate to meet magnetic, structural, and corrosion resistance performance requirements and a cover fabricated from ferromagnetic and other material as appropriate to meet magnetic, structural, and corrosion resistance performance requirements.

9. The selectively releasable separation nut assembly as in claim 8, comprising a selectively releasable separation nut, said selectively releasable separation nut further comprising a housing, said housing comprising: A rotor assembly, a ball nut raceway and a plurality of ball bearings that support said rotor assembly and cause it to move downwards during and following said preload reduction, a ball nut ball return path, a plurality of first magnet segments radially polarized north pole in and an alternating plurality of second magnet segments radially polarized south pole in, bonded, or otherwise fastened, to the inside diameter of said housing, a plurality of magnetic flux paths for said magnet segments within said housing, a plurality of sears with rolling element bearing raceways, that prior to said initial actuation by the electric motor actuated initial release mechanism, hold said rotor assembly in said locked condition, an energy dissipating resilient pad, a plurality of mounting features that secure said selectively releasable separation nut to said first body, and a hole in a base of said housing that permits insertion of said bolt or said reset tool.

10. The selectively releasable separation nut assembly as in claim 9, comprising a selectively releasable separation nut, said selectively releasable separation nut further comprising a housing, said housing comprising said rotor assembly, said rotor assembly comprising: A dynamically balanced rotor, a releasable segmented nut for securing said bolt, a dynamically balanced rotatable lock ring having a plurality of lock ring indexing lugs and a plurality of internal splines, and a friction reducing rolling element thrust bearing between said releasable segmented nut and said dynamically balanced rotor.

11. The selectively releasable separation nut assembly as in claim 10, comprising a selectively releasable separation nut, said selectively releasable separation nut further comprising a housing, said housing comprising said rotor assembly, said rotor assembly comprising said dynamically balanced rotor, said dynamically balanced rotor comprising: Ferromagnetic and other material as appropriate to meet magnetic, structural, and corrosion resistance performance requirements, an electrically conductive energy dissipation element affixed to said dynamically balanced rotor, a plurality of magnetic flux paths within said dynamically balanced rotor for said energy dissipation element, a ball screw, integrated into said dynamically balanced rotor, that enables said dynamically balanced rotor to rotate and move axially in said ball nut raceway and said plurality of ball bearings, a plurality of surfaces that interface with the plurality of sears, at an angle such that forces between said plurality of surfaces and said plurality of sears will force said plurality of sears out of engagement with said plurality of surfaces during said initial actuation and said angle will minimize the outward radial force on said plurality of sears, a plurality of surfaces that interface with said plurality of rotatable lock ring indexing lugs, a rolling element thrust bearing raceway for said friction reducing rolling element thrust bearing machined into said dynamically balanced rotor, and a polygonal hole in a base of said dynamically balanced rotor.

12. The selectively releasable separation nut assembly as in claim 8, comprising a selectively releasable separation nut, said selectively releasable separation nut further comprising said cover, said cover comprising: An electric motor coil winding assembly bonded, or otherwise affixed, to the inside diameter of said cover, a lead wire assembly routed from said motor coil windings to outside said cover, a plurality of magnetic flux paths within said cover for said motor coil windings, a dynamically balanced release armature assembly, a guide bearing, or bearings, that support said dynamically balanced release armature, a plurality of screws and dowel pins that affix said cover to said housing and react said bolt tightening torque from said cover to said housing, and a plurality of cover alignment lugs that interface with said releasable segmented nut, react said bolt tightening torque, and index said rotatable lock ring indexing lugs relative to said releasable segmented nut to affect said mechanical release of said bolt.

13. The selectively releasable separation nut assembly as in claim 12, comprising a selectively releasable separation nut, said selectively releasable separation nut further comprising said cover, said cover comprising said dynamically balanced release armature assembly, said dynamically balanced release armature assembly comprising: A release armature fabricated from ferromagnetic and other material as appropriate to meet magnetic, structural, and corrosion resistance performance requirements, a plurality of first magnet segments radially polarized north pole out and an alternating plurality of second magnet segments radially polarized south pole out, bonded, or otherwise fastened, to the outside diameter of said release armature, a plurality of magnetic flux paths for said magnet segments within said release armature, a plurality of profiled raceways for rolling element bearings, a plurality of friction reducing rolling element bearings between said profiled raceways on said dynamically balanced release armature assembly and said plurality of sears, that hold said sears in said locked condition with said rotor assembly prior to the initial actuation of said selectively releasable separation nut, said plurality of friction reducing rolling element bearings, between said profiled raceways on said dynamically balanced release armature assembly and said plurality of sears that, during said initial actuation of said selectively releasable separation nut, roll into a plurality of recessed areas in said profiled raceways on said dynamically balanced release armature assembly and allow said plurality of sears to be forced out of engagement with said rotor assembly by said reaction forces between said plurality of sears and said plurality of angled interface surfaces with said dynamically balanced rotor, a plurality of armature springs that hold said dynamically balanced release armature in said locked condition and react against said housing, said plurality of armature springs that, following said initial actuation, return said dynamically balanced release armature, said plurality of rolling element bearings, and said plurality of sears to said locked engagement with said rotor assembly.

14. The selectively releasable separation nut assembly as in claim 6 comprising said selectively releasable separation nut, said selectively releasable separation nut comprising said electric motor actuated initial release mechanism, wherein: The magnetic flux from said plurality of first magnet segments, radially polarized north pole outwards, passes radially outwards across a gap that provides clearance between moving and stationary parts, through said electric motor coil winding assembly, clockwise and counterclockwise through said plurality of magnetic flux paths within said cover, radially inwards back through said electric motor coil winding assembly, across said gap, into two adjacent alternately polarized magnet segments, clockwise and counterclockwise through said plurality of magnetic flux paths within said dynamically balanced release armature assembly, and back into the south poles of said first magnet segments, said magnetic flux of said plurality of radially alternately polarized magnets interacts with an electric current of the externally supplied electrical signal in the electric motor coil winding assembly to produce a motor torque, said electric motor actuated initial release mechanism produces said motor torque of appropriate direction and distance such that said dynamically balanced release armature assembly travels past a point causing said initial actuation and releases said plurality of sears, said electric motor actuated initial release mechanism, that when after said dynamically balanced release armature travels past said point of sear release, develops reduced motor torque that balances the torque of said armature springs so that said dynamically balanced release armature stops in a non-impact, non-shock generating, manner, and said electric motor actuated release mechanism, that when after said dynamically balanced release armature travels further past said point of sear release, develops reverse direction motor torque that, combined with said torque of the plurality of said armature springs, stops said dynamically balanced release armature in said non-impact, non-shock generating, manner and returns said dynamically balanced release armature to a position where said motor torque and said armature spring torque are balanced.

15. The selectively releasable separation nut assembly as in claim 12, comprising said selectively releasable separation nut, said selectively releasable separation nut further comprising said cover, said cover comprising said dynamically balanced release armature assembly, wherein: Said dynamically balanced release armature assembly will not rotate and cause said preload reduction to zero of said preload force loop when said selectively releasable separation nut is subjected to inertial forces resulting from environmental shock or vibration.

16. The selectively releasable separation nut assembly as in claim 10, comprising said selectively releasable separation nut, said selectively releasable separation nut further comprising said housing, said housing comprising said rotor assembly, said rotor assembly comprising said releasable segmented nut, said releasable segmented nut comprising: a plurality of segments, an internal thread, that secures said bolt, a plurality of axial external splines, the outer surfaces of which are cylindrical and the radial surfaces of which that face in a counterclockwise direction, as viewed from said cover have a bevel of approximately 45 degrees, and a plurality of notches that interface with said plurality of cover alignment lugs and react the torque on said releasable segmented nut when said bolt is tightened and prevent said releasable segmented nut from rotating.

17. The selectively releasable separation nut assembly as in claim 10, comprising said selectively releasable separation nut, said selectively releasable separation nut further comprising said housing, said housing comprising said rotor assembly, said rotor assembly comprising said dynamically balanced rotatable lock ring, comprising:

A continuous structural ring, a plurality of axial internal splines, the internal surfaces of which are cylindrical, that align with said plurality of external axial splines of said segmented nut and retain said segmented nut closed in said locked condition, said plurality of axial internal splines, the radial surfaces of which that face in a clockwise direction as viewed from said cover have a bevel of approximately 45 degrees, in opposition to said plurality of axial external splines beveled surfaces of said segmented nut, said plurality of rotatable lock ring indexing lugs that interface with said plurality of surfaces on said dynamically balanced rotor and hold said rotatable lock ring internal splines in alignment with said plurality of external splines on said releasable segmented nut when said rotor assembly is held in said locked condition by said plurality of sears, a plurality of stop surfaces, between said rotatable lock ring indexing lugs and said plurality of cover alignment lugs, that align said plurality of internal splines of said lock ring with the plurality of notches between said plurality of external splines of said releasable segmented nut when said rotor assembly is unlocked by said plurality of sears, and a top surface that interfaces with said plurality of cover alignment lugs that maintains a vertical alignment of said rotatable locking ring with said releasable segmented nut.

18. The selectively releasable separation nut assembly as in claim 9, comprising a selectively releasable separation nut, said selectively releasable separation nut further comprising a housing, said housing comprising said rotor assembly, said rotor assembly further comprising: A plurality of torsion springs, connecting between said plurality of segments of said releasable segmented nut and said rotatable lock ring, that when said rotor assembly is released by said plurality of sears and the preload in said bolt is approximately zero, force said rotatable locking ring to rotate so that said plurality of internal splines of said rotatable lock ring are misaligned with said plurality of external splines of said segmented nut, force said segments of said releasable segmented nut radially outward, and cause said releasable segmented nut to open and affect said mechanical release of said bolt.

19. The selectively releasable separation nut assembly as in claim 8, comprising a selectively releasable separation nut, said selectively releasable separation nut further comprising said cover, said cover further comprising: A segment separator with a beveled circumference that acts to force downwards and separate said releasable segmented nut during said preload reduction and said mechanical release of said selectively releasable separation nut, a separator spring that forces said segment separator and said rotor assembly downwards to ensure said mechanical release, and a cap secured to said cover by threads, or other moans, that retains and guides said segment separator and said separator spring within said cover.

20. The selectively releasable separation nut assembly as in claim 10, comprising a selectively releasable separation nut, said selectively releasable separation nut further comprising a housing, said housing comprising said rotor assembly, said rotor assembly comprising said friction reducing rolling element thrust bearing said friction reducing rolling element thrust bearing comprising: a plurality of rolling elements, a thrust washer raceway situated between said plurality of rolling elements and said releasable segmented nut, and a rolling element thrust bearing raceway machined into said dynamically balanced rotor.

21. The selectively releasable separation nut assembly as in claim 10, comprising said selectively releasable separation nut, said selectively releasable separation nut further comprising said housing, said housing comprising said rotor assembly, said rotor assembly comprising said friction reducing rolling element thrust bearing, said friction reducing rolling element thrust bearing further comprising: A plurality of contact surface configurations, that may be conical or otherwise shaped, between said plurality of rolling elements, said thrust washer raceway, and said thrust bearing raceway surface machined into said dynamically balanced rotor that enable angular misalignment between said bolt and said selectively releasable separation nut, and a contact interface between said releasable segmented nut and said thrust washer raceway that may be flat to enable radial misalignment between said bolt and said selectively releasable separation nut.

22. The selectively releasable separation nut assembly as in claim 9, comprising a selectively releasable separation nut, said selectively releasable separation nut further comprising said housing, said housing comprising said ball nut raceway and said plurality of ball bearings, wherein: a helix angle of said ball nut raceway great enough so that either said bolt preload, or said separator spring force, is greater than that necessary to overcome mechanical friction within said selectively releasable separation nut and cause said dynamically balanced rotor to rotate axially downwards within said ball nut and said plurality of ball bearings, said helix angle of said ball nut raceway is low enough so that an angular velocity of said dynamically balanced rotor is maximized during and following said preload reduction.

23. The selectively releasable separation nut assembly as in claim 6 comprising said selectively releasable separation nut, said selectively releasable separation nut comprising said kinetic energy storage mechanism, said kinetic energy storage mechanism comprising: Said rotor assembly.

24. The selectively releasable separation nut assembly as in claim 6 comprising said selectively releasable separation nut, said selectively releasable separation nut comprising said kinetic energy storage mechanism, wherein: Said rotor assembly stores a linear kinetic energy equal to $0.5 \times$(the mass of said rotor assembly)$\times$(the instantaneous linear velocity of said rotor assembly)$^2$, said dynamically balanced rotor additionally stores a rotational kinetic energy equal to $0.5 \times$(the mass moment of inertia of said dynamically balanced rotor about said rotor axis)$\times$(the instantaneous angular velocity of said dynamically balanced rotor)$^2$, said rotational kinetic energy stored increases as the square of the angular velocity of said dynamically balanced rotor, and a total kinetic energy stored is the sum of said linear and said rotational instantaneous kinetic energies of said rotor assembly and said dynamically balanced rotor.

25. The selectively releasable separation nut assembly as in claim 6 comprising said selectively releasable separation nut, said selectively releasable separation nut comprising said magnetic eddy current damper, said magnetic eddy current damper comprising: Said housing, said plurality of alternately radially polarized magnet segments, said plurality of magnetic flux paths within said housing, said dynamically balanced rotor, said electrically conductive energy dissipation element, and said plurality of magnetic flux paths for said energy dissipation element within said dynamically balanced rotor.

26. The selectively releasable separation nut assembly as in claim 6 comprising said selectively releasable separation nut, said selectively releasable separation nut comprising said magnetic eddy current damper, wherein: a magnetic flux flows from the plurality of first magnet segments, radially polarized north pole inwards, passes radially inwards across a gap that provides clearance between moving and stationary parts, through said electrically conductive energy dissipation element, clockwise and counterclockwise through said plurality of magnetic flux paths for said energy dissipation element, radially outwards back through said energy dissipation element, across said gap, into two said adjacent alternately polarized magnet segments, clockwise and counterclockwise through said plurality of magnetic flux paths within said housing, and back into the south poles of said first magnet segments, said magnetic flux induces electric currents in said electrically conductive energy dissipation element and the magnetic fields of said induced electric currents generate an instantaneous torque that opposes the rotation of said dynamically balanced rotor during said preload reduction and said dissipation of stored kinetic energy, said instantaneous opposing torque is proportional to said dynamically balanced rotor angular velocity, and said eddy current damper dissipates as heat said strain energy proportional to said (instantaneous opposing torque)×(the differential angular rotation angle of said dynamically balanced rotor) at any point during and following said bolt preload reduction and said dissipation of said kinetic energy.

27. The selectively releasable separation nut assembly as in claim 6 comprising said selectively releasable separation nut, said selectively releasable separation nut comprising said mechanical friction that dissipates energy as heat at any point during the preload reduction and the dissipation of stored kinetic energy, wherein:

Said friction energy is proportional to (the instantaneous friction torque between said ball nut raceway and said plurality of bearings and said ball screw)×(the differential angular rotation angle of said dynamically balanced rotor), plus (the instantaneous friction torque of said friction reducing rolling element thrust bearing)×(the differential angular rotation angle of said dynamically balanced rotor).

28. The selectively releasable separation nut assembly as in claim 11, comprising said selectively releasable separation nut, said selectively releasable separation nut further comprising a housing, said housing comprising said rotor assembly, said rotor assembly comprising said dynamically balanced rotor, said dynamically balanced rotor comprising said ball screw, wherein: A minimum required travel of said ball screw within said ball nut raceway is greater than the total distance said rotor assembly advances within said ball nut raceway during said preload reduction and said dissipation of stored kinetic energy.

29. The selectively releasable separation nut assembly as in claim 9, comprising said selectively releasable separation nut, said selectively releasable separation nut further comprising said housing, said housing comprising said energy dissipating resilient pad, wherein: Said energy dissipating resilient pad damps shock that could otherwise be generated if said rotor assembly should travel further than said minimum required travel, following said release cycle of said selectively releasable separation nut.

30. The selectively releasable separation nut assembly as in claim 17, comprising said selectively releasable separation nut, said selectively releasable separation nut further comprising said housing, said housing comprising said rotor assembly, said rotor assembly comprising said dynamically balanced rotatable lock ring, wherein: Said dynamically balanced rotatable lock ring will not cause release of said releasable segmented nut when said selectively releasable separation nut is exposed to inertial forces resulting from environmental shock and vibration.

31. The selectively releasable separation nut assembly as in claim 1, comprising said reset tool, said reset tool comprising: A polygonal shank that closely fits said polygonal hole in said base of said dynamically balanced rotor, a cylindrical nose, smaller in diameter than said bolt minor diameter, extending beyond said polygonal shank, and a handle affixed to said polygonal shank.

32. The selectively releasable separation nut assembly as in claim 1, comprising said selectively releasable separation nut, wherein said selectively releasable separation nut may be reset per the following reset operation: A reset tool that when inserted through said hole in said housing, engages with said polygonal hole in said base of said dynamically balanced rotor, and engages with and forces said segment separator out of contact with said releasable segmented nut, said reset tool, that when engaged with said selectively releasable separation nut and rotated counter to said rotation of said rotor assembly during said release cycle, causes said plurality of dynamically balanced rotor surfaces to engage said plurality of lock ring indexing lugs, counter rotate said rotatable lock ring, engage said plurality of beveled spline faces on said lock ring and said segmented nut, and force by a cam action said releasable segmented nut into said closed, locked condition, said reset tool, that when engaged with said selectively releasable separation nut, and further rotated counter to said rotation of said rotor assembly during said release cycle, causes said plurality of dynamically balanced rotor surfaces and said plurality of sears into said locked condition and secure said separation nut in said locked condition, and said selectively releasable separation nut is ready for re-insertion and retorqueing said bolt following said reset operation.

33. The selectively releasable separation nut assembly as in claim 1, comprising said selectively releasable separation nut, wherein: A time for said preload reduction is controlled at any instant during said preload reduction by said energy dissipated as heat by said magnetic eddy current damper, said mechanical friction, and said kinetic energy stored in said rotor assembly and said dynamically balanced rotor.

34. The selectively releasable separation nut assembly as in claim 1, comprising said selectively releasable separation nut and said bolt, wherein: A shock generated by said separation nut and said bolt during said initial actuation, said preload reduction, and said mechanical release is near zero.

35. The selectively releasable separation nut assembly as in claim 1, comprising said selectively releasable separation nut and said bolt, wherein: A momentum transfer from said separation nut and said bolt to said second body is near zero.

36. The selectively releasable separation nut assembly as in claim 1, comprising said selectively releasable separation nut and said bolt, wherein: A velocity of said bolt following said mechanical release is less than the linear velocity of said rotor assembly and is near zero.

37. The selectively releasable separation nut assembly as in claim 1, comprising said selectively releasable separation nut, wherein: Said selectively releasable separation nut is releasable and resettable multiple times without a necessity to replace component parts of, refurbish, or replace said selectively releasable separation nut.

\* \* \* \* \*